United States Patent
Landau et al.

(10) Patent No.: US 6,529,207 B1
(45) Date of Patent: *Mar. 4, 2003

(54) IDENTIFYING SILHOUETTE EDGES OF OBJECTS TO APPLY ANTI-ALIASING

(75) Inventors: Edouard Landau, San Jose, CA (US); Adrian Sfarti, Sunnyvale, CA (US); Adam Malamy, Foster City, CA (US); Mei-Chi Liu, Sunnyvale, CA (US); Robert Laker, Fremont, CA (US); Paolo Sabella, Pleasanton, CA (US)

(73) Assignee: WEBTV Networks, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/584,463

(22) Filed: May 31, 2000

Related U.S. Application Data

(62) Division of application No. 09/057,327, filed on Apr. 8, 1998, now Pat. No. 6,115,050.

(51) Int. Cl.[7] ............................................... G09A 5/00
(52) U.S. Cl. ....................................... 345/619; 345/611
(58) Field of Search ............................... 345/433, 136, 345/138, 431, 432, 435, 443, 441, 591, 589, 592, 606, 607, 611, 612, 613, 614, 615, 619, 673, 629, 421, 419, 634, 635; 382/269

(56) References Cited

U.S. PATENT DOCUMENTS

| | | | |
|---|---|---|---|
| 3,889,107 A | 6/1975 | Sutherland | 235/152 |
| 5,287,436 A | 2/1994 | Fischer et al. | 395/119 |
| 5,303,339 A | 4/1994 | Ikuma | 395/132 |
| 5,357,600 A | 10/1994 | Shirman et al. | 395/133 |
| 5,359,704 A | 10/1994 | Rossignac et al. | 395/122 |
| 5,574,835 A | 11/1996 | Duluk, Jr. et al. | 395/121 |
| 5,579,456 A | 11/1996 | Cosman | 395/128 |
| 5,729,672 A | 3/1998 | Ashton | 395/126 |
| 5,742,277 A | 4/1998 | Gossett et al. | 345/136 |
| 6,111,582 A | * 8/2000 | Jenkins | 345/421 |

OTHER PUBLICATIONS

Angel ("Interactive Computer Graphics":1997; ISBN:0–201–85571–2): Fig.2.19.*

* cited by examiner

Primary Examiner—Mano Padmanabhan
(74) Attorney, Agent, or Firm—Workman, Nydegger & Seeley

(57) ABSTRACT

A graphics rendering system creates an image based on objects constructed of polygonal primitives, which can generate the perception of three-dimensional objects displayed on a two-dimensional display device. An anti-aliasing operation is applied to silhouette edges of the objects, which are the edges of primitives which are displayed at the perimeter of an object. A silhouette edge can be identified by determining how many times an edge is rendered, with each instance of the rendering of an edge corresponding to the rendering of a primitive that adjoins the edge. An edge that is rendered exactly once is interpreted as a silhouette edge. An example of a silhouette edge is an edge that adjoins one triangular primitive that is viewable and another triangular primitive that is hidden from view by other primitives. Another technique for identifying a silhouette edge can be applied to closed objects by determining whether a first primitive adjoining an edge is hidden from view by other primitives and a second primitive also adjoining the edge is viewable. Once the silhouette edges are identified, the anti-aliasing operation is applied thereto.

28 Claims, 15 Drawing Sheets

PASS ONE

PASS ONE

PASS TWO

PASS TWO

ANTI-ALIASING

IDENTIFYING SILHOUETTE EDGES OF OBJECTS TO APPLY ANTI-ALIASING

RELATED APPLICATION

This application is a divisional of U.S. patent application Ser. No. 09/057,327, filed Apr. 8, 1998, and entitled "Object-Based Anti-Aliasing", now U.S. Pat. No. 6,115,050, which is incorporated herein by reference.

BACKGROUND OF THE INVENTION

1. The Field of the Invention

The present invention relates generally to computer graphics rendering, and more particularly to anti-aliasing of the edges of objects represented in computer generated images.

2. The Prior State of the Art

Graphics rendering systems create images of objects which are combined in a visual scene. An object is a computer readable specification of appearance attributes which, when used to create an image, has the appearance of physical substance. A scene is a collection of objects distributed around an area to be represented in an image. In a two dimensional graphics rendering system an image is constructed based on the location and orientation of two dimensional objects in a scene. For a three dimensional graphics rendering system, three dimensional objects are placed in a three dimensional scene with a three dimensional coordinate system. A camera is defined by at least a location and a direction of view relative to a scene. Rendering is the process of creating an image based on the objects which would be visible to a camera viewing a scene if it were real, and placing this image in memory, typically a frame buffer. The image is composed of an array of picture elements, or pixels, which each exhibit a color. In real-time rendering systems, the image is displayed, typically on a computer monitor, while a later image is being constructed. The part of the rendering system which interprets object data to determine what the scene looks like is referred to as the rendering pipeline.

High speed rendering systems typically rely on combinations of simple polygons, referred to as primitives, to build more complex objects. The rendering pipeline of such a system is generally optimized to render primitives into the frame buffer quickly. Triangles are commonly used as primitives, since objects of arbitrary complexity may be composed of triangles. This is illustrated in FIG. 1.

The discrete pixels of an image in a frame buffer are comparable to samples of a continuous image. A well known phenomenon associated with discrete sampling of continuous values is aliasing. In the field of computer graphics rendering, aliasing is most often encountered in the form of straight lines which have a jagged or stair-stepped appearance, as illustrated in FIG. 2. The edges of primitives (such as triangles) rendered to an image may exhibit this pattern, which is especially noticeable where there is high contrast between the color of a foreground primitive and the color of the background. This aliasing of primitive edges is generally undesirable, and steps are taken to reduce the effect of it.

If nothing is done to reduce the effects of aliasing, a pixel which represents an area of a scene containing an edge of high color contrast in a computer generated image will generally be colored according to whichever color happens to coincide with the centroid of the pixel. This is illustrated in FIG. 3, where a pixel is shown representing an area which is partly red and partly blue. The pixel is given the color red, because the centroid of the pixel falls on the red primitive. A more realistic image, and one without noticeable aliasing effects, would be obtained if the pixel were colored with both red and blue, in the proportion each is present in the area represented by the pixel. This blending of colors is at the heart of most schemes to reduce the effects of aliasing. Efforts to reduce aliasing in the field of computer graphics are referred to as anti-aliasing.

One method of performing anti-aliasing, known in the art as sub-sampling, is to determine colors for a number of samples within the area represented by each pixel. Each of these sub-samples is at a slightly different location, and the sub-samples are averaged together to determine a final color for the pixel. This method reduces aliasing considerably, but at the expense of increasing the amount of calculation, and time, required for rendering each pixel. The time expense is so large that this solution is not generally used for real-time rendering systems.

A solution which is feasible for real-time rendering is to blend the color of each pixel in an image with the colors of surrounding pixels. This is, in effect, a low-pass filter applied to the initial image determined by the rendering pipeline. The added amount of calculation is much less than for the sub-sampling solution, but the results are poor. The entire image is blurred, and appears to be out of focus.

Another solution to the problem of anti-aliasing real-time computer generated images is to only apply anti-aliasing techniques to areas of an image which correspond to object silhouette edges. A silhouette edge is the visible perimeter of an object. Sharp contrasts (and therefore areas of noticeable aliasing) are generally most likely to occur at silhouette edges. Finding the portions of an image which correspond to object silhouette edges is not trivial. One method of finding these edges is to use a buffer which holds one bit per pixel of the finished image. The buffer is set to all zeros, then as each object is rendered the state of the bits in the buffer corresponding to the drawn pixels are changed. When all objects have been rendered, the bits of this buffer will have gradients from one to zero or from zero to one in areas corresponding to the silhouette edges of many of the objects. The corresponding areas in the image are then subjected to low-pass filtering. This method, however, uses a lot of memory for the buffer, does not always catch all of the object silhouette edges and generates a lot of false edges.

What is needed is a system and method for performing anti-aliasing on those parts of a rendered image which should be anti-aliased, without disturbing those portions of the image which should not be anti-aliased. To do this a system should accurately determine object silhouette edges without requiring intensive additional computing or large amounts of additional memory.

SUMMARY OF THE INVENTION

The present invention is a computer apparatus and method for anti-aliasing the silhouette edges of objects rendered by a rendering pipeline. The objects are composed of primitives, such as triangles, each of which has edges which may be a silhouette edge of the object under particular circumstances. When the object is constructed, information concerning which edges may be silhouette edges in particular circumstances is encoded with the object. While the rendering pipeline renders an image in a first pass, information is collected concerning how many times some of the potential silhouette edges are drawn. After the rendering pipeline is finished with the first pass, a second pass begins.

In this pass, the rendering pipeline uses the information about the edges which was encoded with each object, in conjunction with the information about the number of times particular edges were drawn, to determine which edges in the image lie at the silhouette edge of an object. If a particular edge has a primitive drawn on one side, but none on the other side, that edge is a silhouette edge. These silhouette edges are anti-aliased, providing a clear image without significant aliasing effects, through the use of a method which does not require much additional time or memory.

DETAILED DESCRIPTION OF THE INVENTION

The present invention may be implemented as functional components consisting of hardware, software, firmware or some combination thereof. In the embodiment described, the invention is implemented in a three dimensional graphics rendering system in which the basic primitives are triangles. This is for illustrative purposes only, and in other embodiments the invention may be part of other types of graphics systems, including for example a two dimensional graphics rendering system, and primitives of other shapes may be used.

Strips and Fans

Where a complex object to be rendered is composed of contiguous triangles, a great deal of redundancy in the specification of vertices might occur, with the coordinates for some points being repeatedly given to the rendering pipeline. To avoid this type of redundancy a number of multi-primitive shapes are composed in such a way that the amount of redundancy in their specification may be reduced. These higher-level primitives are then used for constructing more complex objects.

Figure 1:
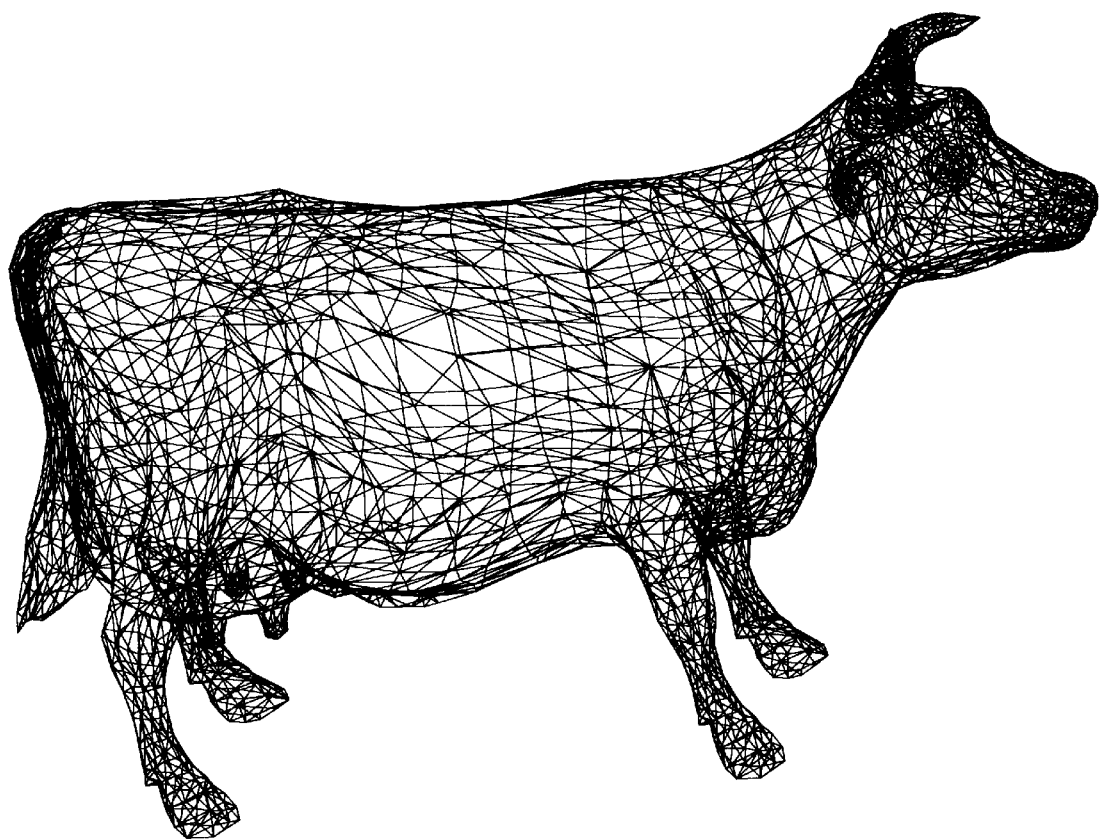
FIG. 1 illustrates how complex objects may be constructed from triangles.
Figure 2:
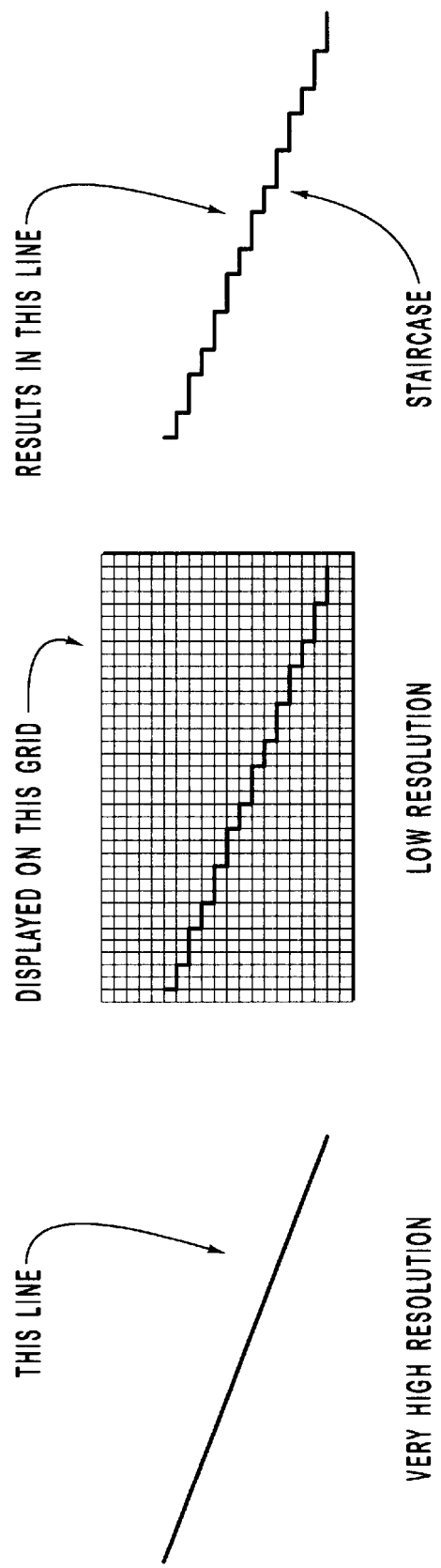
FIG. 2 illustrates aliasing effects on a line displayed at low resolution.
Figure 3:
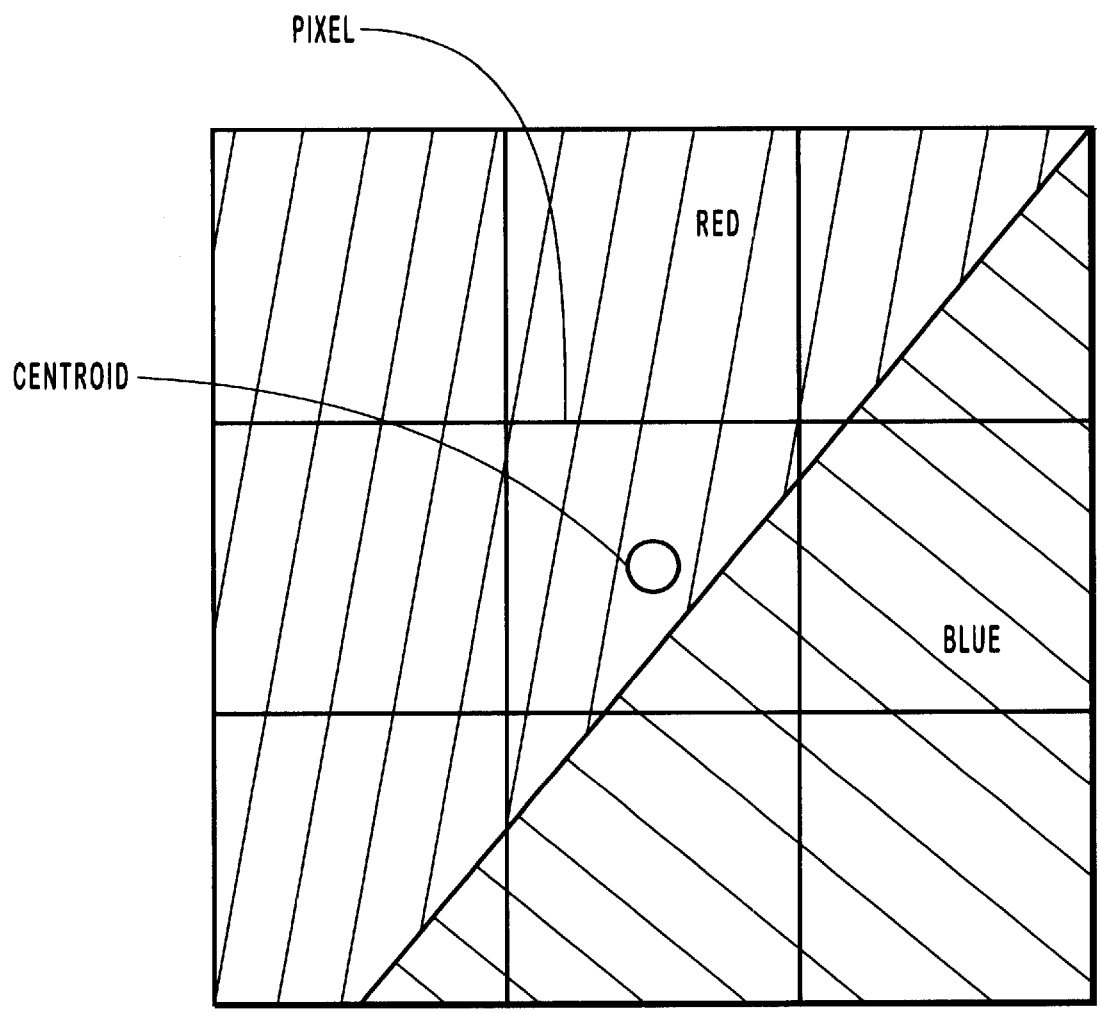
FIG. 3 illustrates how color is assigned to a pixel which represents an edge of high color contrast.
Figure 4:
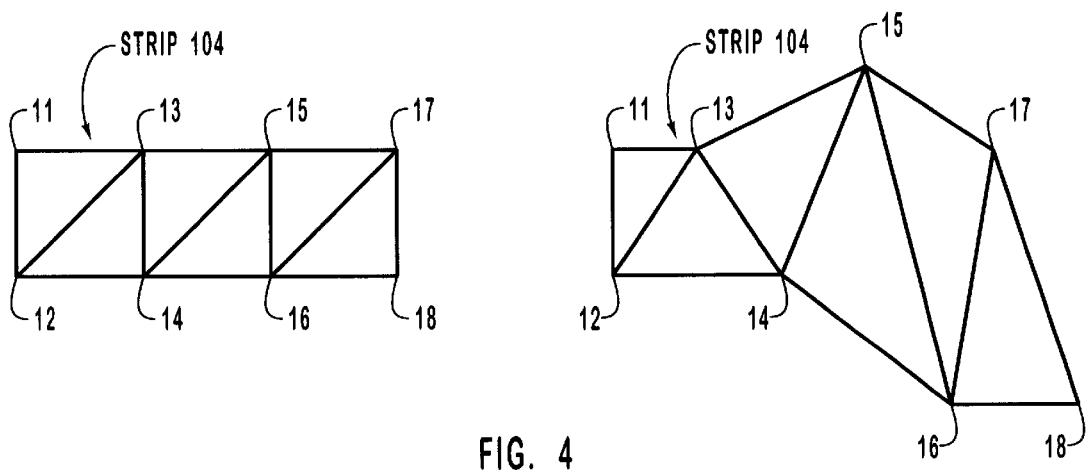
FIG. 4 illustrates a few ways in which triangles may be connected to form a strip.
Figure 5:
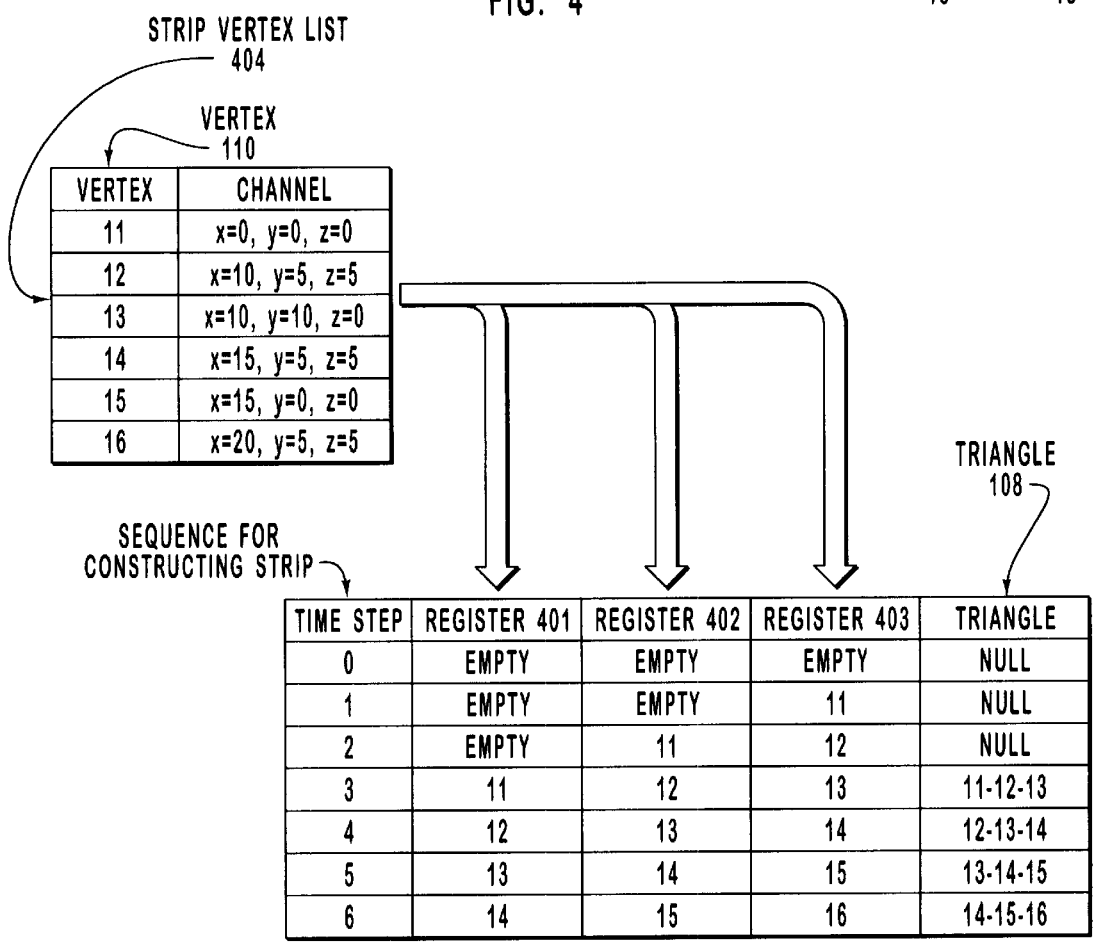
FIG. 5 illustrates the sequence of registers used by the processor in interpreting a strip.

Two of the most common higher-level primitives used in three dimensional object modeling are strips 104 and fans 106. Both strips 104 and fans 106 are used by the graphics rendering system of the illustrative embodiment. Some examples of strips 104 are shown in FIG. 4. The vertices of each strip 104 given in the definition of a strip 104 (11 through 18). At its simplest, a strip 104 is specified to the rendering pipeline as an instruction to draw a strip 104, a series of vertices with associated channel information, and an instruction to stop rendering the strip 104. A channel is a field of information for which each vertex has an associated value. Examples of typical channels associated with vertices include the X, Y, and Z coordinates of each vertex, color values, opacity values, and texture coordinates. The first triangle is specified by the first three vertices (e.g. 11, 12 and 13), with each subsequent triangle in the strip 104 being specified by one more vertex. To interpret a list of vertices 110, such as the one illustrated in FIG. 5 as list 404, a rendering pipeline uses three registers. Initially, at time step 0, all three registers are empty. As each vertex 110 in list 404 is read into register 403, the old contents of register 403 are moved to register 402, and the old contents of register 402 are moved to register 401. When all three registers contain vertex information, at time step 3, they together specify the three vertices 11, 12, and 13 of a triangle 108. The sides of the triangle 108 are specified by the lines which connect each set of two vertices: register 401 to register 402, register 402 to register 403, and register 403 to register 401. After the initial triangle 108 is specified, as each new vertex is read into 403, and the older vertices are shifted back by one, a new triangle 108 in the strip 104 is represented by the vertices in the three registers (401–403). The six vertices 110 specified in list 404 result in four triangles 108 at time steps 3–6. These four triangles 108, determined during time steps 0–6, together form a strip 104. A strip 104 need not be coplanar, so complex three dimensional objects can be constructed out of strips 104 of triangles.

Figure 6:
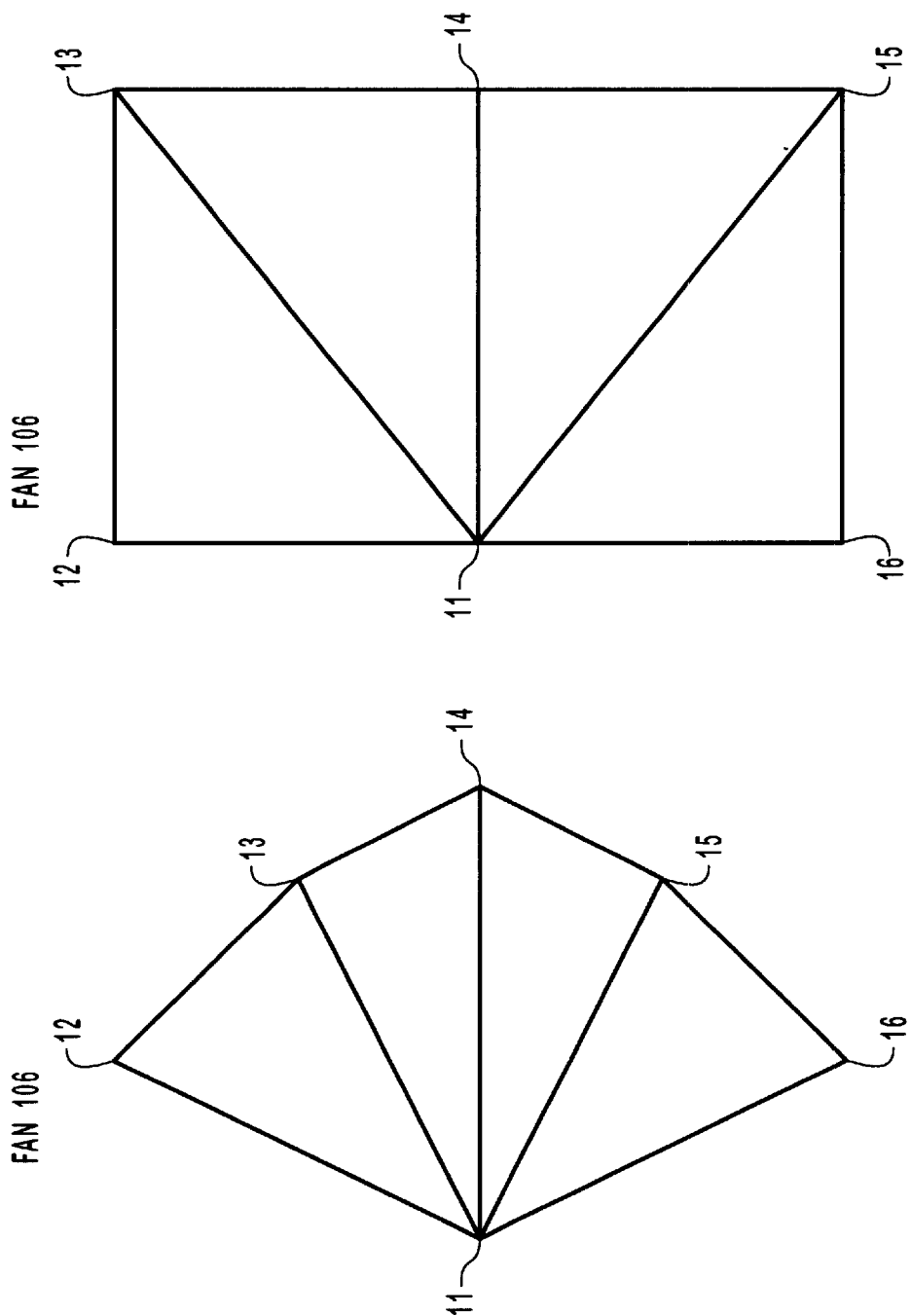
FIG. 6 illustrates a few ways that triangles may be connected to form a fan.
Figure 7:
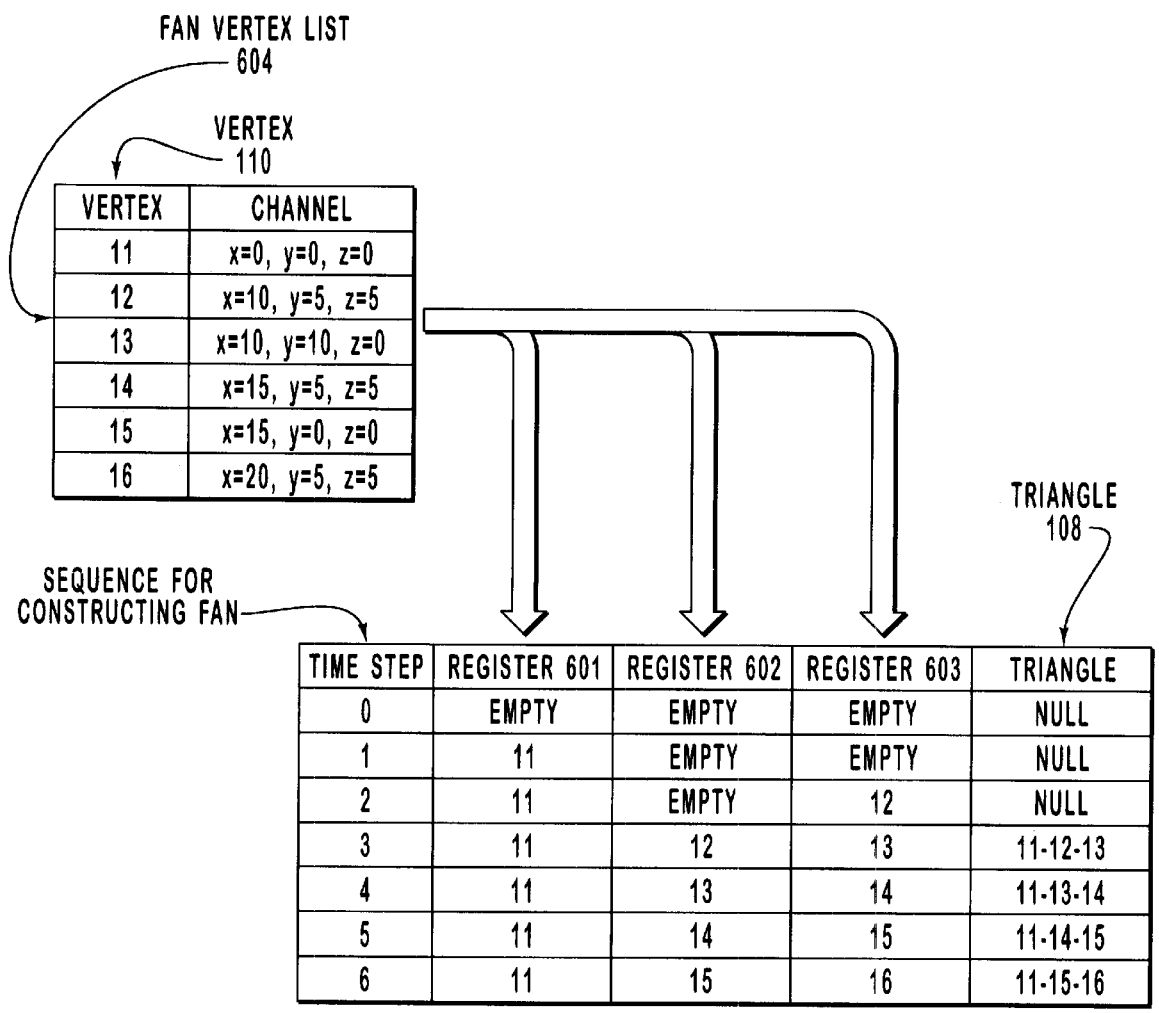
FIG. 7 illustrates the sequence of registers used by the processor in interpreting a fan.

The other typical higher-level primitive used to construct three dimensional objects is the fan 106. FIG. 6 illustrates fans 106 constructed from triangles. The most notable feature of a fan 106 is the single vertex 11 shared by all triangles which make up the fan 106. A fan 106, like a strip 104, only requires one vertex to be specified in order to define a new triangle, after the first triangle is specified. Three registers, illustrated in FIG. 7, are used by the rendering pipeline to interpret the list 604 of vertices 110 making up a fan 106. The first vertex of list 604 is the vertex 11 shared among all triangles 108 of fan 106. At time step 1 this vertex 11 goes into register 601 and is not changed until the entire fan 106 has been processed. Each subsequent vertex 110 is read into register 603, with the old contents of register 603 replacing the contents of register 602. When the three registers are filled with the first three vertices 11, 12, and 13, at time step 3, the first triangle 108 is specified by the vertices of the registers, as in the case of the strip 104. As each subsequent vertex 110 is read into 603 a new triangle 108 of the fan 106 is specified by the contents of the three registers (601–603). Time steps 0–6 illustrate the construction of a four triangle fan 106. Because the vertex 11 in register 601 does not change, each triangle of fan 106 shares the first vertex 11 of the list.

Figure 8:
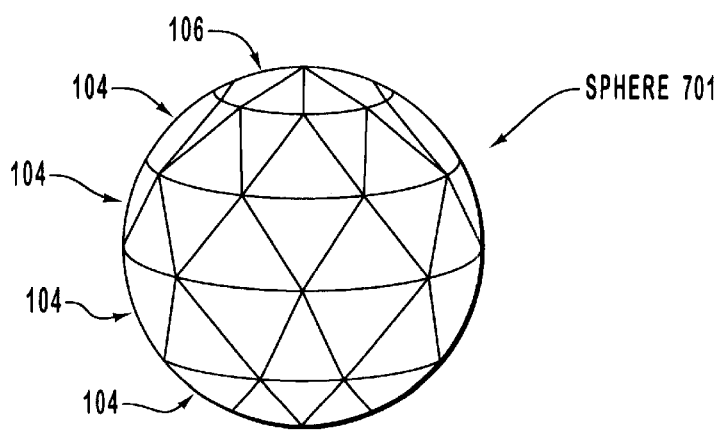
FIG. 8 illustrates a sphere composed of strips and fans.

The combination of strips 104 and fans 106 allows for the specification of three dimensional objects of arbitrary complexity. FIG. 8 illustrates a sphere 701 constructed of strips 104 and fans 106. The poles of sphere 701 are constructed of fans 106, with lateral strips 104 making up the rest of it.

Hidden Surfaces

In order to realistically render a number of primitives in three dimensions, those primitives which are closer to the camera must obscure those primitives which are further away and behind the closer primitives. Two techniques are used in the illustrative embodiment to facilitate the necessary obscuring of primitives: Z buffering and back-face culling.

In a three dimensional scene, the axis which lies along the viewpoint of the camera is designated the Z axis, with the X and Y axes lying perpendicular to this axis. A Z buffer is a buffer which is large enough to contain a single Z coordinate value for every pixel of an image. When the rendering pipeline draws a pixel to the image, it also records the Z value of the point which is represented by that pixel in the Z buffer location associated with the pixel. Before any pixel is drawn to the image, however, the Z value of the point which is represented by that pixel is compared to the current Z value in the Z buffer location for that pixel. If the new pixel to be drawn represents a point on a primitive which is closer to the camera, and therefore has a smaller Z value, the pixel is drawn and the Z-buffer is updated with the smaller Z value. Otherwise, the point on the primitive being rendered is obscured by a closer object, and is therefore not drawn. Several implementations of Z buffering are known in the art, including the use of the inverse of Z in place of the Z value in the buffer.

Z-buffering detects obscured points on primitives before they are rendered to an image, but after the rendering pipeline has completed a lot of calculation. When a point is not drawn because it is obscured, the calculation does not lead to anything being added to the image. Some of this calculation is necessary, but in some cases entire primitives may be determined to be hidden even before Z buffering is applied. In FIG. 8, approximately half of the triangles making up sphere 701 would be obscured by the other half of the triangles. The Z buffering technique described above would result in these triangles being properly obscured, but a substantial amount of calculation would be performed on each of these obscured triangles in order to determine which are shown.

Sphere 701 is a closed object, meaning that only the outside is viewable, and that only one side of each primitive making it up is visible. Because sphere 701 is a closed is object, each triangle making it up may be considered to have an in side and an out side, where only the out sides are ever viewed by an exterior camera. Those triangles which are obscured in the view of sphere 701 are all ones which have their in sides facing the camera. For any closed object, planar primitives which have their in sides facing the camera are obscured, and are called back-facing. The triangles which have their out sides facing the camera, and which are not necessarily obscured, are called front-facing. Back-face culling is the technique of differentiating between triangles facing the camera and triangles facing away from the camera. By determining that a primitive which is part of a closed object is facing away from a camera which is outside the closed object, it is known that the primitive need not be drawn and further calculation related to that primitive can be avoided. If the camera is inside a closed object, then front facing primitives would be culled, and the back-facing primitives would be rendered.

Several methods for performing back-face culling are known in the art. In the illustrative embodiment, back-face culling is implemented by computing the area of the rendered image of each triangle as the cross product of the X, Y projections of two of the triangle sides. The sign of the area indicates whether the triangle will be rendered clockwise or counter-clockwise in the image. If the sign of the area indicates that the image of triangle is clockwise, but the triangle is specified as being a counter-clockwise triangle, or if the sign indicates that the image is counter-clockwise, but the triangle is specified as being a clockwise triangle, then the triangle is facing away from the camera, and need not be rendered. The clockwise direction associated with a triangle may be specified either directly or indirectly. Because every triangle in a strip 104 will be drawn in the opposite direction from the one preceding it (first clockwise, then counter-clockwise, etc.), an indication of direction for the first triangle in a strip 104 is sufficient to indicate the direction of all triangles in the strip 104. For a fan 106, all triangles are drawn in the same direction, so an indication of the direction of the first triangle in a fan 106 is also sufficient to indicate the direction of all triangles in the fan 106. In the illustrative embodiment, the data structure which defines a strip 104 or fan 106 (described below) carries a flag which indicates the direction of the first triangle of the strip 104 or fan 106. This is used by the rendering pipeline to determine the direction of all triangles in each strip 104 and fan 106, in order to determine which triangles are back-facing and therefore need not be rendered.

Object Models

Figure 9:
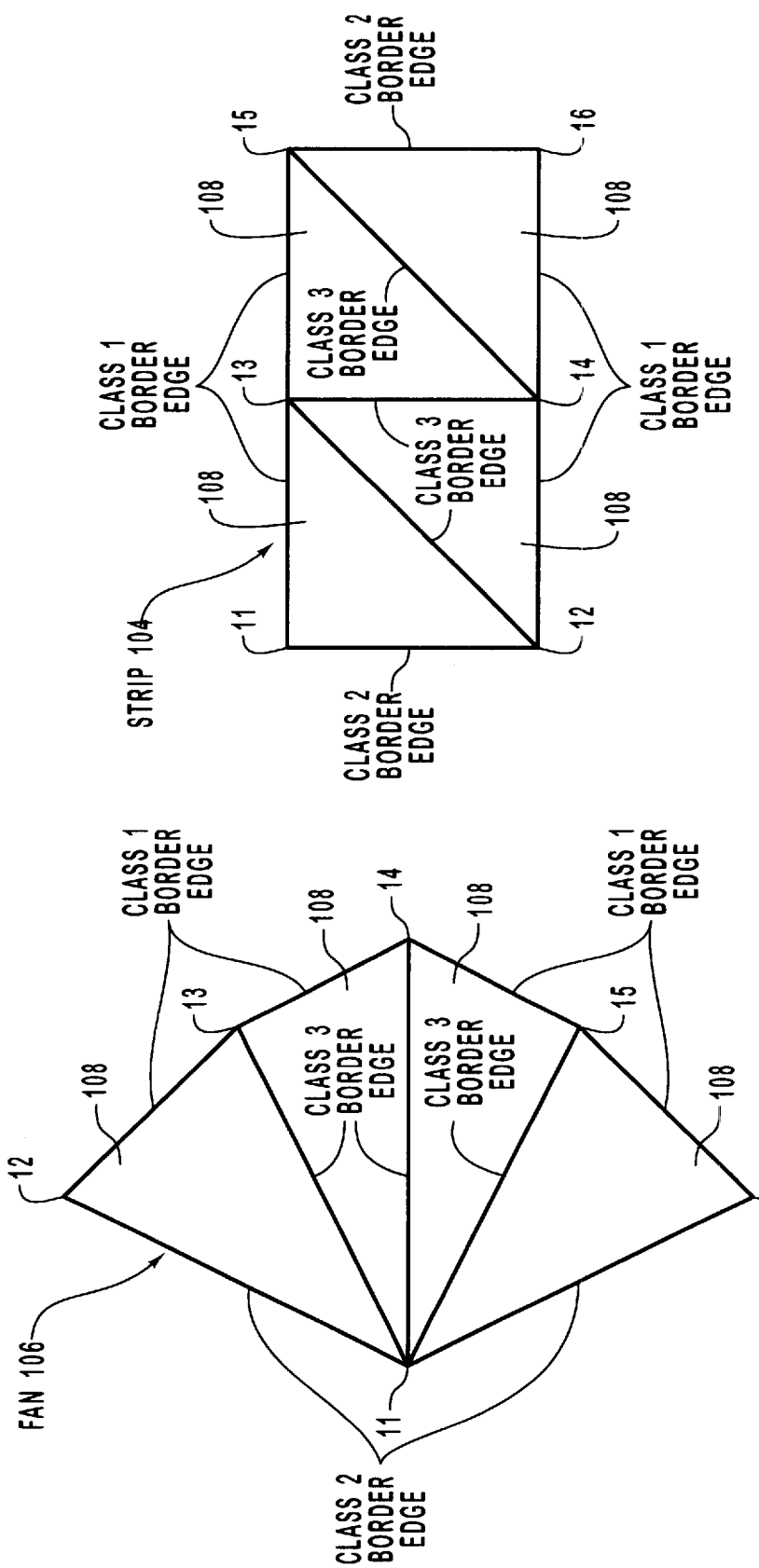
FIG. 9 illustrates a typical strip and fan, showing the association of edges to vertices.

FIG. 9 illustrates a typical strip 104 and a typical fan 106. Every triangle 108 making up the strips 104 and fans 106 has edges which may be border edges in particular circumstances. A "class 1 border edge", as used herein, is an edge which lies on the perimeter, or outline, of a strip 104 or fan 106, but not on a starting or ending edge. In FIG. 9, the class 1 border edges are so marked. The starting and ending edges of a strip 104 or fan 106 are referred to herein as "class 2 border edges". Class 2 border edges are also marked in FIG. 9. Triangle edges which are not class 1 or class 2 border edges are referred to as "class 3 border edges." Class 3 border edges are marked in FIG. 9. Class 1 and class 2 border edges are the only ones which can be silhouette edges of a strip 104 or fan 106 which happens to be coplanar. Class 3 border edges may only be silhouette edges of a strip 104 or fan 106 when one adjoining triangle is back-face culled and another adjoining triangle is not.

One edge of every triangle 108 is a class 1 border edge. The first and last triangles 108 of a strip 104 or fan 106 each also has one class 2 border edge (or two, if a triangle is the only triangle in a strip 104 or fan 106). The result is that the sum of the number of class 1 border edges and the number of class 2 border edges is equal to the number of vertices 110 making up a strip 104 or fan 106.

Figure 10:
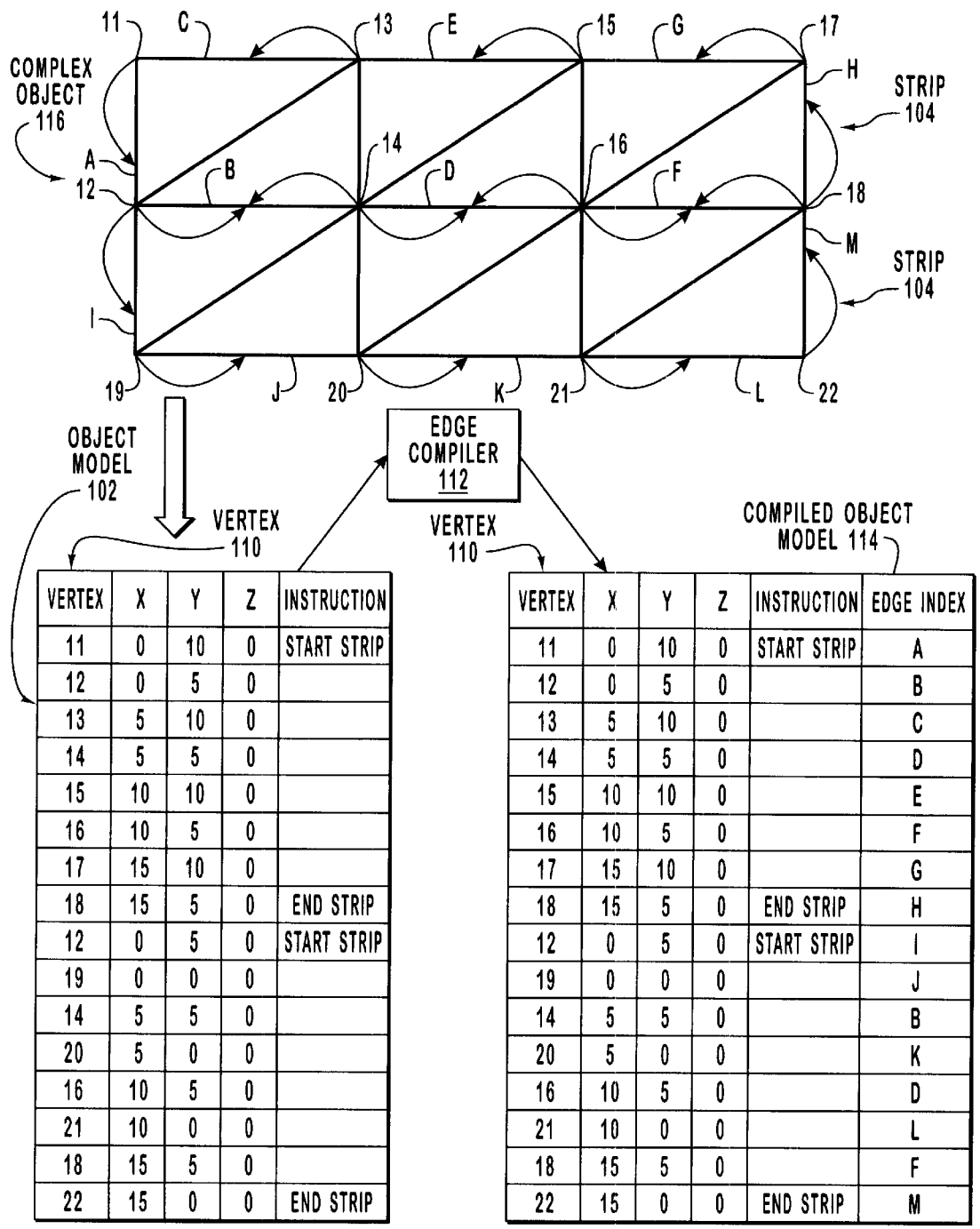
FIG. 10 illustrates the edge indices for a multi-strip object.

In the illustrative embodiment, shown in FIG. 10, complex object 116 is specified by object model 102. An object model 102 specifies lists of vertices (e.g., vertices 11–22) which define either strips or fans or both. Each vertex 110 in object model 102 is associated with a number of channels, a value for each of which appears in object model 102 with the entry for the associated vertex 110. Alternatively, the channel information can be stored in a location other than object model 102, and pointers to the channel information for each vertex 110 can be included in the object model 102. Three of the channels associated with each vertex 110 are the X coordinate, the Y coordinate and Z coordinate for that vertex 110.

These object models 102 are transformed by an edge compiler 112, which produces a compiled object model 114.

The compiled object model 114 contains the same information as object model 102, with the addition of an edge index channel associated with each vertex 110.

Each vertex 11–22 in strip 104 (or a fan) is associated with a particular class 1 or class 2 border edge, as indicated by the arrows in FIG. 10. Some of the vertices 110 in a compiled object model 114 may be associated with more than one class 1 or class 2 border edge. This is because each vertex 110 is associated with a class 1 or class 2 border edge for each strip or fan of which it is a part. If a vertex is a part of more than one strip or fan, it will generally be associated with more than one edge. The edge compiler 112 generates a unique identifier for every class 1 and class 2 border edge in an object model 102. Class 1 and class 2 border edges which share identical locations are treated as the same edge, for these purposes, and receive the same identifier. This identifier is the edge index channel which is added to the object model 102 when the edge compiler 112 creates the compiled object model 114. In the illustrative embodiment, the edge compiler 112 creates the compiled object model 114 off-line, before the graphics rendering system begins operating. The edge compiler 112 creates a list of all class 1 and class 2 border edges in an object model. The edge compiler 112 then finds all pairs of identical class 1 and class 2 border edges, and re-sorts the list so that these edges are next to each other. This re-sorted list makes it easier to assign unique identifiers for unique class 1 and class 2 border edges, by simply moving through the list. As each edge is encountered, the edge is given a new identifier if it differs from the preceding edge, and is given the same identifier as the preceding edge otherwise. When the identifiers have been assigned, the list is re-sorted so that the entries in the compiled object model 114 are in the same order as the entries in the object model 102.

For every strip or fan of which a vertex 110 is a part, the vertex 110 will have an accompanying edge index in the compiled object model 114. The accompanying edge index is the index assigned to the class 1 or class 2 border edge associated with the vertex 110. The determination of which edge a vertex 110 is associated with is straight forward. For a given triangle, one edge will be a class 1 border edge, and either zero, one, or two edges will be class 2 border edges (starting edges and ending edges). Table 1 indicates which vertex (the "first," "second," or "third") is associated with the class 1 edge for a triangle:

TABLE 1

| Vertex for Class 1 edge. | Triangle is clockwise. | Triangle is counter-clockwise. |
|---|---|---|
| Triangle is part of a strip. | First | Third |
| Triangle is part of a fan. | Third | Second |

Table 2 indicates which vertex is associated with the starting edge of a strip or fan, for a triangle which is the first triangle in a strip or fan:

TABLE 2

| Vertex associated with the starting edge (class 2). | Triangle is clockwise. | Triangle is counter-clockwise. |
|---|---|---|
| Triangle is part of a strip. | Second | First |
| Triangle is part of a fan. | Second | First |

Table 3 indicates which vertex is associated with the starting edge of a strip or fan, for a triangle which is the first triangle in a strip or fan:

TABLE 3

| Vertex associated with the ending edge (class 2). | Triangle is clockwise. | Triangle is counter-clockwise. |
|---|---|---|
| Triangle is part of a strip. | Third | Second |
| Triangle is part of a fan. | First | Third |

In other embodiments, other schemes can be used to associate vertices with edges. An object model 102 will typically have multiple strips or fans or both, as illustrated in FIG. 10, where multi-strip object 116 is composed of two contiguous strips 104. The edges connecting the two strips 104 are shared, and each shared edge has only one edge index. In the example illustrated in FIG. 10, the class 1 border edges are labeled B, C, D, E, F, G, J, K, and L. Edges B, D, and F are each shared by the two strips 104, and are each associated with two vertices, one vertex for each strip 104.

The Rendering Process

Figure 11A:
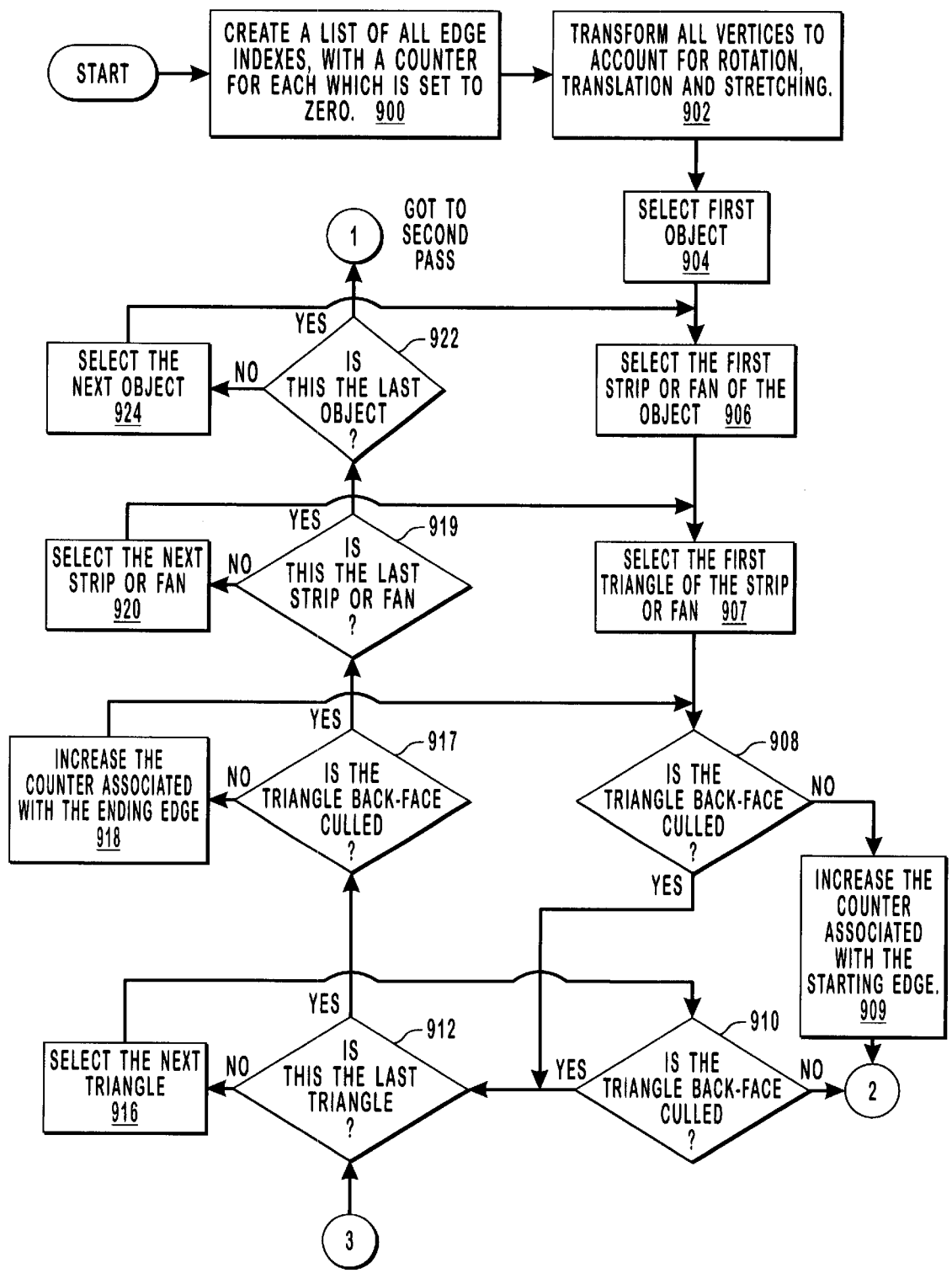
FIG. 11a is part of a flowchart illustrating the first pass of the processor.
Figure 12:
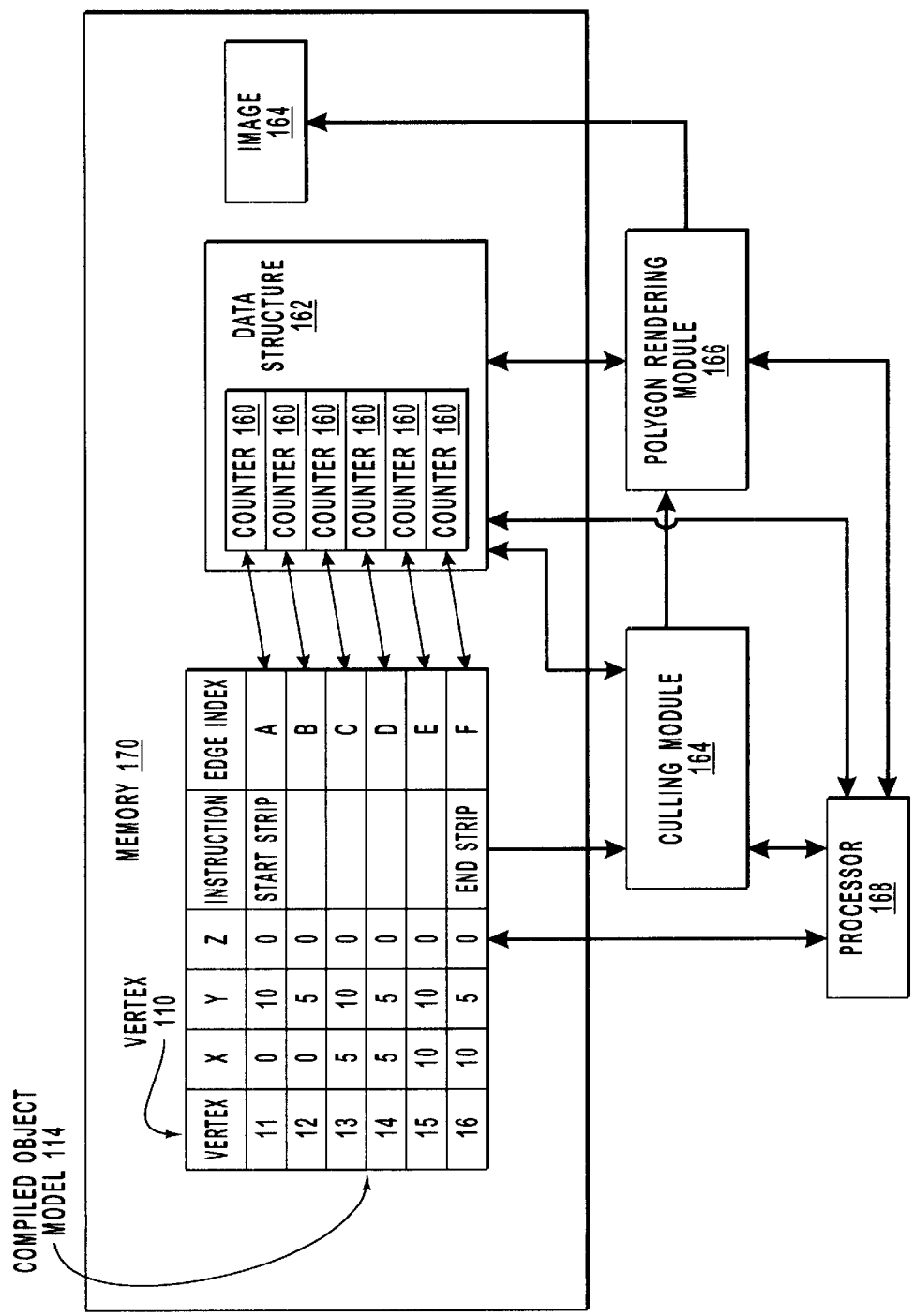
FIG. 12 illustrates an embodiment in which processor controls culling module and polygon rendering module.

The rendering pipeline is responsible for most of the calculation required to determine an image based on a scene. In the embodiment illustrated in FIG. 11a and FIG. 12, processor 168 carries out the rendering process in two passes. The processor 168 utilizes a culling module 164 and a polygon rendering module 166, both of which may be either independent of the processor, or implemented as functions carried out by is the processor 168. A memory 170 is configured to accommodate objects in the form of compiled object models 114, data structures 162, and an image 164. Data structure 162 includes a number of counters 160, each of which is associated with a class 1 or class 2 border edge in compiled object model 114. The processor 168 begins by creating 900 a list of all edge indexes from all compiled object models 114 in the scene, and associating a counter 160 with each edge index. Each object model 114 has a unique "base" address through which the edge indices are accessed, so edges with the same index on different object models 114 are seen as separate edges. The processor 168 transforms 902 the coordinates of each vertex 110 of each primitive to account for any rotation, translation or stretching of the objects in the scene.

The processor 168 then begins to loop through each of the objects, strips, fans, and triangles in the scene. In step 904 the first object in the scene is selected, in step 906 the first strip or fan in the selected object is selected, and in step 907 the first triangle in the selected strip or fan is selected. A culling module 164 then determines 908 whether the selected triangle should be back-face culled, or whether it needs to be rendered. If the selected triangle is not back-face culled, then the counter 160 associated with the starting edge is increased 909 by one. If the selected triangle is back-face culled, then the processor 168 determines 912 whether the selected triangle is the last one in the strip or fan. If not, the next triangle is selected 916, and the method continues with the culling module 164 determining 910 whether the selected triangle should be back-face culled. If so, the method continues with step 912. If the selected triangle is determined 912 to be the last one, the culling module 164 determines 917 whether the selected triangle should be back-face culled. If not, the counter 160 associated with the ending edge is increased 918 by one. Following step 918 or if the triangle is back-face culled at step 917, the processor 168 determines 919 whether the selected strip or fan is the last one. If not, then the next strip or fan is selected 920, and the method starting with step 907 is repeated. If the selected strip or fan is the last, then the processor 168 determines 922 whether the selected object is the last one in the scene. If not, the processor 168 selects 924 the next object, and the method starting with step 906 is repeated. If the selected object is the last one, then the processor 168 moves on to the second pass.

Figure 11B:
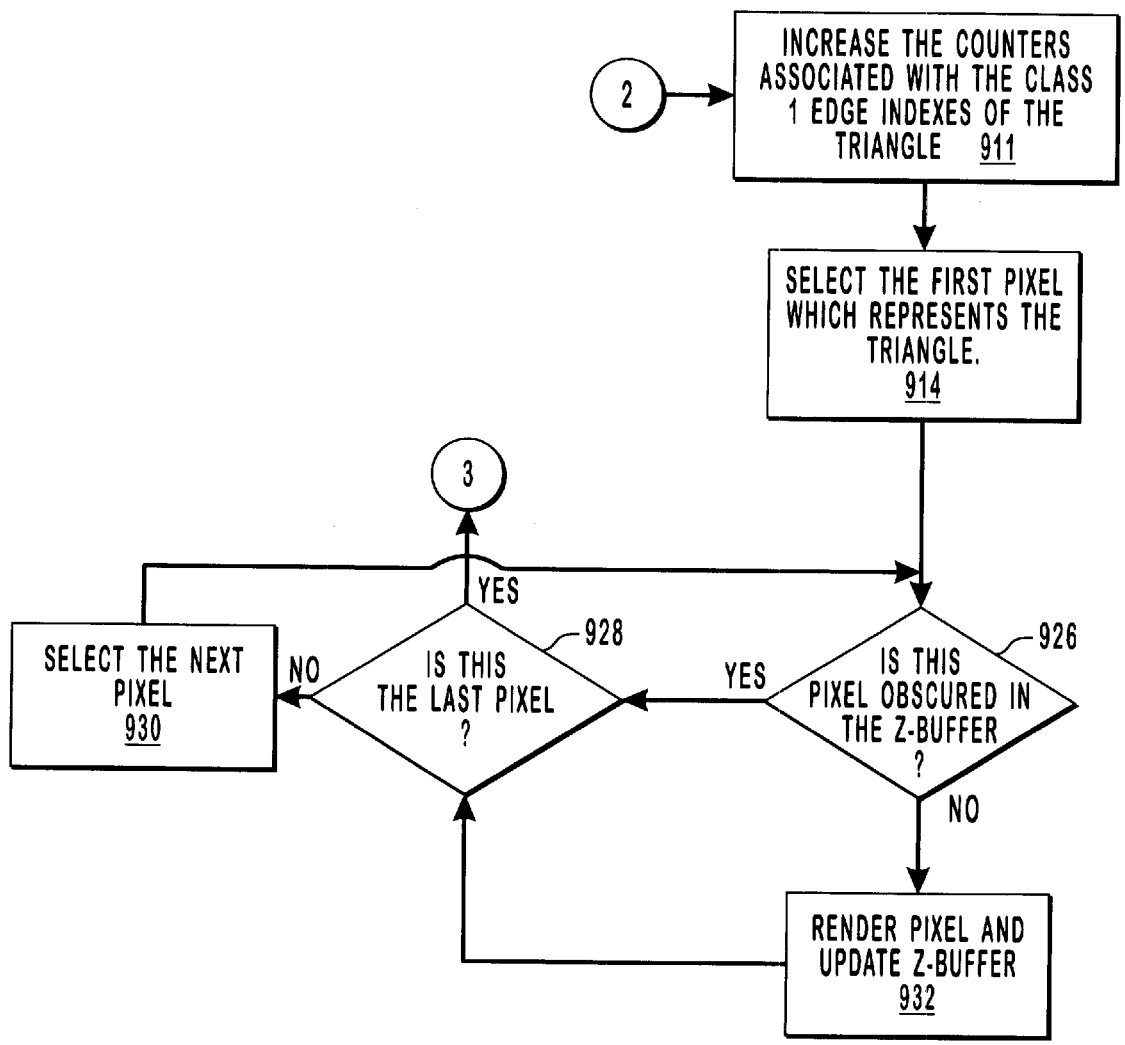
FIG. 11b is part of a flowchart illustrating the first pass of the processor.

Returning to steps 909 and 910, if the triangle is not back-face culled at step 910, or following step 909, the polygon rendering module 166 takes over, and the Z buffering scheme illustrated in FIG. 11b is used to determine which points are obscured by other objects. At step 911, the polygon rendering module 168 increases the counters 160 associated with the edge indexes for all class 1 and class 2 border edges of the triangle. When the rendering of objects is finished, some edge indexes is will have counters 160 which are at zero. These edge indexes are associated with class 1 or class 2 border edges which have not been drawn, and therefore do not need to be anti-aliased. Other edge indexes will have counters 160 which are set to more than one. These edge indexes are associated with class 1 or class 2 border edges for which triangles have been drawn on both sides, indicating that these edges are not silhouette edges of the object and do not need to be anti-aliased. Only those edge indexes with counters 160 set to exactly one are associated with class 1 or class 2 silhouette edges, because in that case only one bordering triangle has been drawn.

After step 911, the polygon rendering module 166 loops through all of the pixels which represent points on the triangle. At step 914 the first pixel is selected. The polygon rendering module 166 determines 926 whether the point represented by the pixel is obscured, by referring to the Z buffer. If the point is obscured, the polygon rendering module 166 goes to step 928, described below. If the point is not obscured, the polygon rendering module 166 uses 932 information about the triangle, such as color, texture, and reflectance; and information about the scene, such as the position of lights, to determine the color of the triangle at that point. The color is then applied to the appropriate pixel in the image, and the Z-buffer is updated with the Z value of the represented point. The polygon rendering module 166 then determines 928 whether the selected pixel is the last one in the triangle. If not, the next pixel is selected 930, and the method starting with step 926 is repeated. If the selected pixel is the last one for the triangle 928, the polygon rendering module 166 continues on to step 912, described above. This is the general process followed by the polygon rendering module 166 in constructing an image in the frame buffer.

Figure 11C:
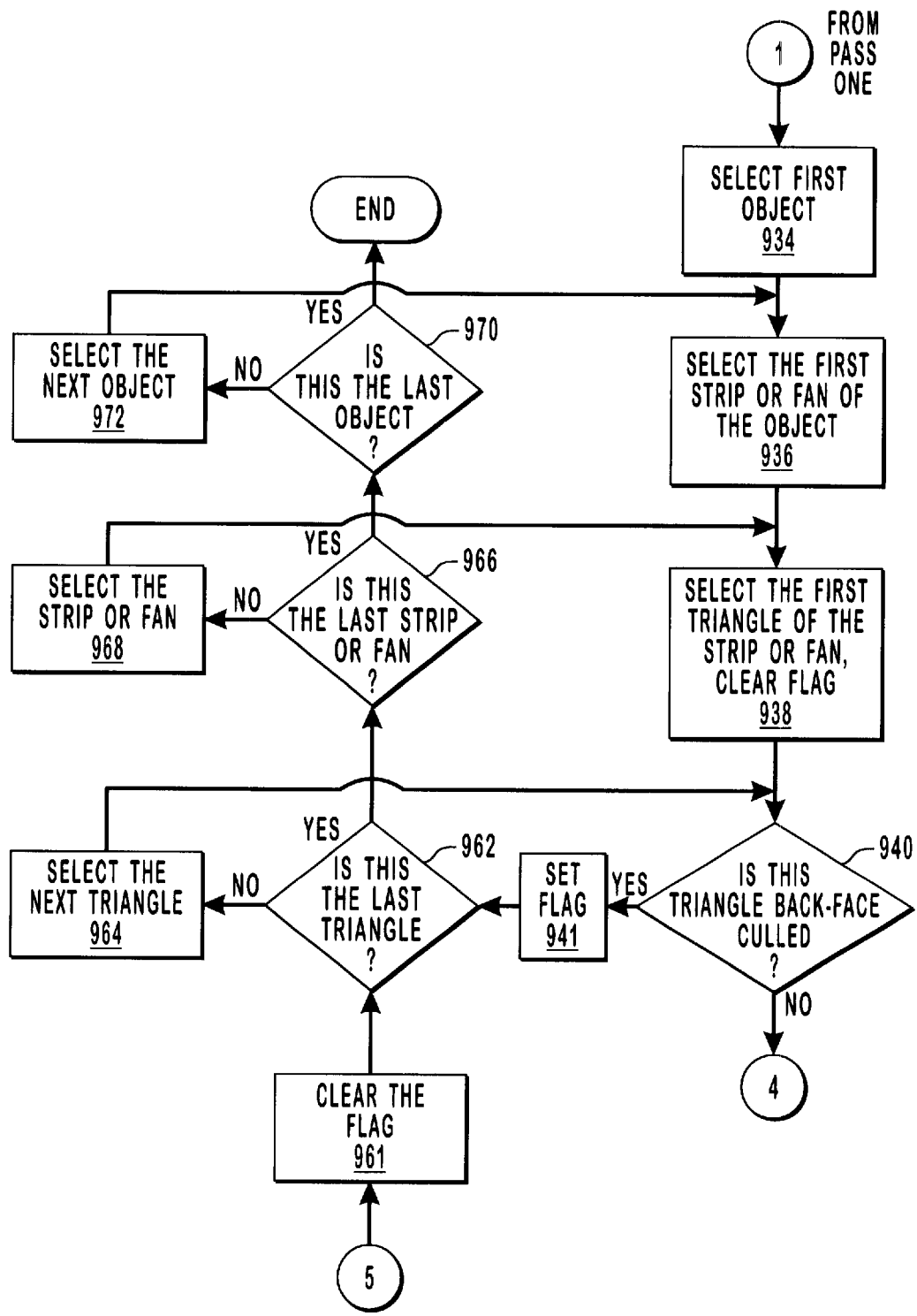
FIG. 11c is part of a flowchart illustrating the second pass of the processor.
Figure 11D:
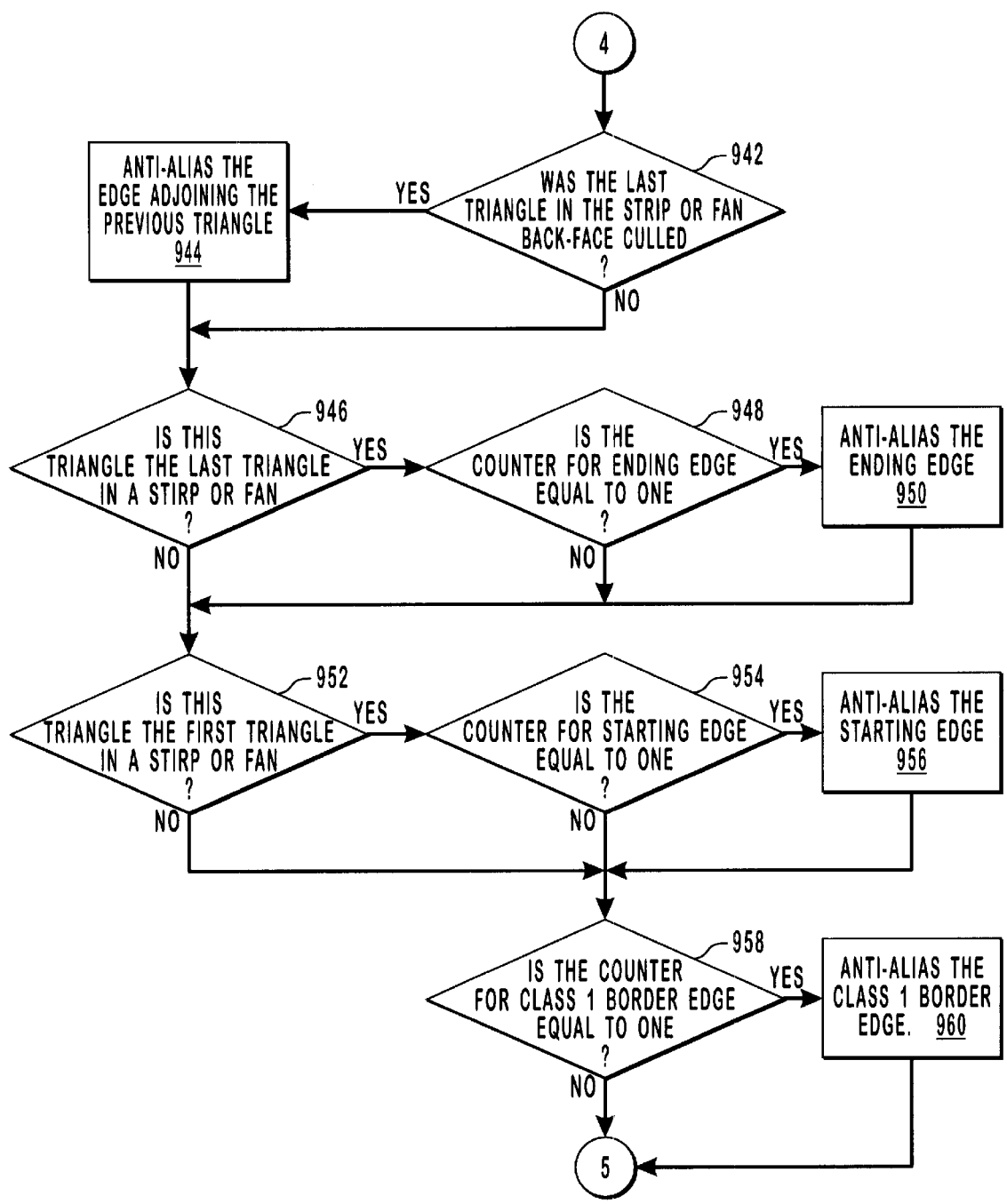
FIG. 11d is part of a flowchart illustrating the second pass of the processor.

When the polygon rendering module 166 is finished rendering the objects of a scene into an image, the processor 168 begins the second pass, during which anti-aliasing of he silhouette edges takes place. FIGS. 11c and 11d illustrate the second pass. As in the first pass, the processor 168 begins by selecting 934 the first object of the scene, selecting 936 the first strip or fan of the selected object, and selecting 938 the first triangle of the selected strip for fan. At this point the processor 168 clears a flag which is used later in the process. At step 940 the culling module 164 determines whether the selected triangle has been back-face culled. In one embodiment, the processor 168 keeps a list of triangles which were back-face culled during the first pass, for use in the second pass. Doing this, however, requires the use of a significant amount of memory for the list. In the illustrative embodiment, the culling module 164 used in the first pass is reused in the second pass, in order to avoid using a large amount of additional memory. If the triangle has been back-face culled, the processor 168 sets 941 the flag discussed above, for use when the next triangle is examined.

The processor 168 then determines 962 whether the selected triangle is the last one in the strip or fan. If not, the next triangle is selected 964, and the method starting with step 940 is repeated. If the selected triangle is the last one, then the processor 168 determines 966 whether the selected strip or fan is the last one in the selected object. If not, then the next strip or fan is selected 968, and the method starting with step 938 is repeated. If the selected strip or fan is the last, then the processor 168 determines 970 whether the selected object is the last one in the scene. If not, the processor 168 selects 972 the next object, and the method starting with step 936 is repeated. If the selected object is the last one, then the second pass comes to an end.

Referring now to FIG. 11d, if the triangle has not been back-face culled in step 940 of FIG. 11c, the processor 168 uses 942 the flag to determine whether the previous triangle had been back-face culled. If it had been, then the class 3 border edge adjoining the two triangles is anti-aliased 944 by a process described below. Whether or not step 944 is executed following step 942, the processor 168 next determines 946 whether the selected triangle is the last one in the strip or fan. If so, the processor 168 determines 948 whether the counter 160 associated with the ending edge is set to one. If it is, then this ending edge is anti-aliased 950 by the process described below. Following step 950, or following a negative determination at steps 946 or 948, the processor 168 next determines 952 whether the selected triangle is the first one in the strip or fan. If so, the processor 168 determines 954 whether the counter 160 associated with the starting edge is set to one. If it is, then this starting edge is anti-aliased 956 by the process described below. Following step 956, or following a negative determination at steps 952 or 954, the processor 168 determines 958 whether the counter 160 for the class 1 border edge of the triangle is set to one. If it is, the class 1 border edge is anti-aliased 960 by the process described below. Whether or not step 960 is executed, the processor 168 next clears the flag 961. Then the process beginning with step 962 is repeated.

Anti-Aliasing

Figure 13:
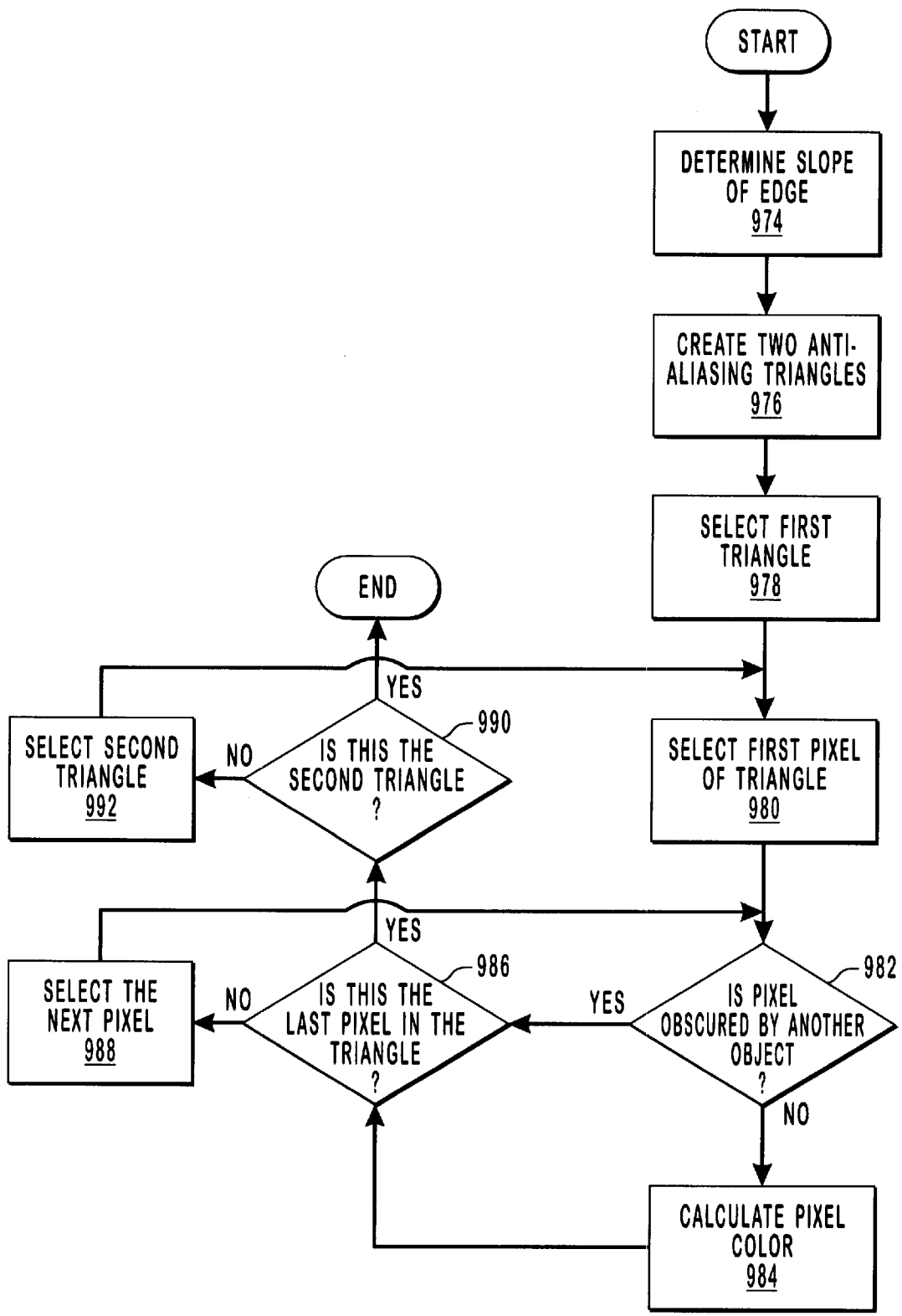
FIG. 13 is a flowchart illustrating a method of anti-aliasing an edge of a triangle.
Figure 14:
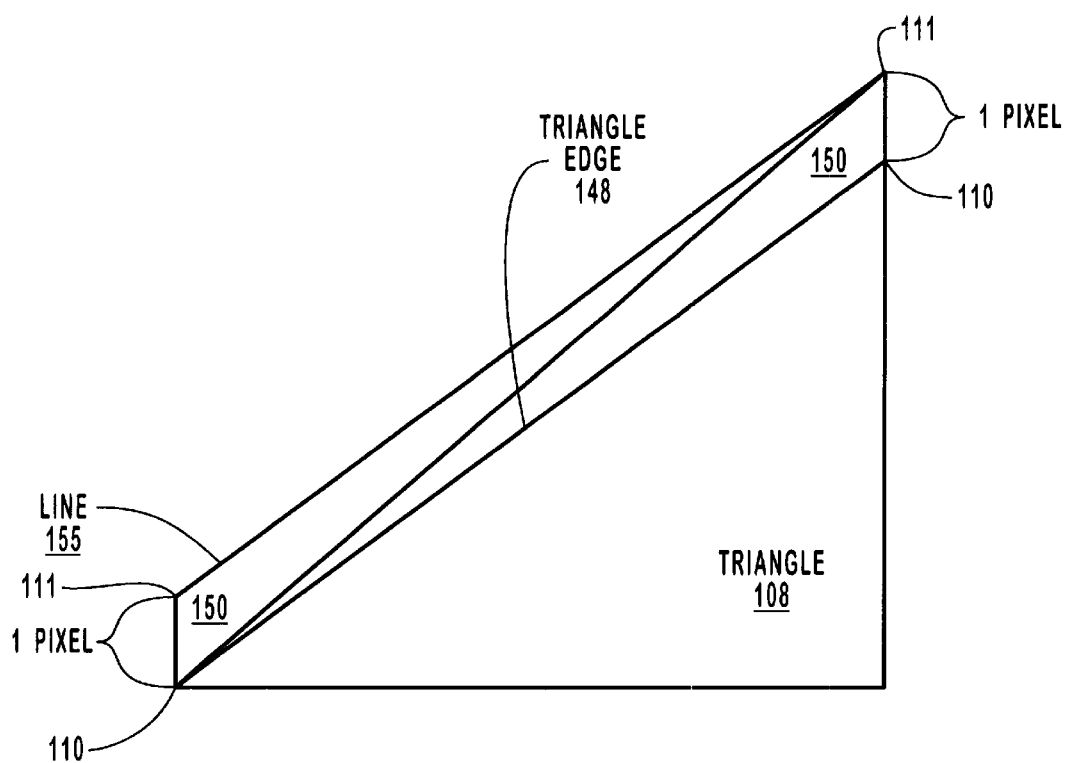
FIG. 14 illustrates the anti-aliasing method.

Referring now to FIG. 13 and FIG. 14, the first step in anti-aliasing an edge 148 is to determine 974 the slope of the edge 148. If the absolute value of the slope is less than or equal to one, the edge 148 is classified as horizontal. Otherwise the edge 148 is classified as vertical. Next, two triangles 150 are determined 976. If the edge 148 has been classified horizontal, the two triangles 150 form a parallelogram adjoining the edge 148 and a line 155 one pixel in the vertical direction away from, and parallel to, the edge 148. This is illustrated in FIG. 14. If the edge 148 has been classified as vertical, the two triangles 150 form a parallelogram adjoining the edge 148 and a line 155 one pixel in the horizontal direction away from, and parallel to, the edge 148. Line 155 is on the opposite side of the edge 148 from the triangle 108 which was drawn. The parallelogram formed by the two triangles 150 is coplanar with the drawn triangle 108 adjoining the edge 148. One of the triangles 150 shares two vertices 110 with drawn triangle 108, and the other shares one vertex 110 with drawn triangle 108. All channel information, including opacity, present in the shared vertices 110 is used for the same vertices 110 in the new triangles 150. The vertices .111 of the triangles 150 which are not shared with triangle 108 are set to an opacity level corresponding to transparent, but otherwise each uses the same channel information as the nearest vertex 110. The parallelogram formed by these triangles 150 shares the opacity of triangle 108 on the shared edge 148, and is transparent on the opposite side.

The first of the new triangles 150 is selected 978, and the first pixel of this triangle 150 is selected 980. The Z buffer is then used to determine 982 whether this pixel is obscured by another object. If it has not been obscured, the new color for that pixel is calculated 984. The new color is a combination of the current pixel color value and the color of triangle 150, as determined from the associated channel information. The opacity of the pixel is interpolated based on the location of the pixel in triangle 150. An opacity value corresponding to transparent would result in the current pixel color value being preserved, and an opacity value corresponding to completely opaque would result in the pixel receiving the triangle 150 color. Opacity values between these extremes result in a new color which is a combination of the other two colors.

After the new color for the pixel is calculated 984, a test is made to determine 986 whether this is the last pixel in triangle 150. If it is not, the next pixel is selected 988 and the process starting with step 982 is repeated. If the current pixel is the last, then it is determined 990 whether the current triangle 150 is the second of the two. If it is not, then the second triangle is selected 992, and the process starting with step 980 is repeated. If the current triangle 150 is the second, then the anti-aliasing process is finished.

The above description is included to illustrate the operation of the preferred embodiments and is not meant to limit the scope of the invention. The scope of the invention is to be limited only by the following claims. From the above description, many variations will be apparent to one skilled in the art that would yet be encompassed by the spirit and scope of the present invention.

What is claimed and desired to be secured by United States Letters Patent is:

1. In a system that renders an image including an object, and wherein the object is comprised of a plurality of primitives having edges, at least some of the edges being silhouette edges that define a visible perimeter of the object, a method for more efficiently identifying the silhouette edges of the object in order to identify the visible perimeter portions of the rendered image which require anti-aliasing to reduce aliasing artifacts that would otherwise appear at the visible perimeter portions of the image, the method comprising the acts of:

generating a list of selected edges of primitives of the object;

determining how many times each of the selected edges in the list is drawn as the object is rendered during a first pass;

determining which edges are drawn only once as opposed to edges drawn more than once, so that edges drawn only once can be identified as corresponding to silhouette edges as opposed to those edges drawn more than once, which correspond to primitive edges that are not silhouette edges; and selecting those edges identified as silhouette edges and applying an anti-aliasing operation to the silhouette edges.

2. A method as recited in claim 1, wherein the object is a closed object and the primitives include triangular primitives, the method further comprising the acts of:

identifying a silhouette edge of the object by performing the acts of:

determining that a first triangular primitive is not rendered because the first triangular primitive is hidden from view by one or more other primitives; and determining that a second triangular primitive shares an edge with the first triangular primitive and that at least a portion of said shared edge is to be rendered as part of the second triangular primitive, so as to determine that said shared edge is a silhouette edge; and applying the anti-aliasing operation to said shared edge that is a silhouette edge.

3. A method as recited in claim 2, further comprising the act of grouping the triangular primitives into strips and fans, the strips and fans consisting of sets of one or more of the triangular primitives.

4. A method as recited in claim 1, wherein the object is a closed object, the method further comprising the act of identifying at least one of the primitives which is not to be rendered by performing back-face culling, including the act of determining that an in side of said at least one of the primitives faces toward a viewer of the object, the viewer being outside of the closed object.

5. A method as recited in claim 1, wherein the act of applying the anti-aliasing operation comprises the acts of:

selecting a line parallel to the silhouette edge, which line does not intersect the primitive that adjoins the silhouette edge;

selecting at least one anti-aliasing polygon having visual characteristics including opacity, such that:

the anti-aliasing polygons occupy a region between the line and the silhouette edge;

the anti-aliasing polygons vary in opacity such that the anti-aliasing polygons are transparent at the line and exhibit the same level of opacity at the silhouette edge as the primitive that adjoins the silhouette edge, and the visual characteristics, other than opacity, of the anti-aliasing polygons are consistent with the primitive that adjoins the silhouette edge; and rendering the anti-aliasing polygons to the image.

6. A method as recited in claim 1, wherein the act of generating the list of selected edges comprises the act of including duplicate edges when a single selected edge corresponds to more than one vertex.

7. A method as recited in claim 6, further comprising the act of assigning identifiers to the selected edges, wherein:

each identifier links one of the selected edges to a vertex; and each border edge is assigned a unique identifier, with duplicate edges receiving the same identifier, the identifiers being used to determine how many times each selected edge is rendered.

8. A method as recited in claim 1, wherein the list of selected edges of primitives includes edges of any primitives that are subject to back-face culling.

9. In a system that renders an image including an object, and wherein the object is comprised of a plurality of primitives having edges, at least some of the edges being silhouette edges that define a visible perimeter of the object, a method for more efficiently identifying the silhouette edges of the object in order to identify the visible perimeter portions of the rendered image which require anti-aliasing to reduce aliasing artifacts that would otherwise appear at the visible perimeter portions of the image, the method comprising the acts of:

defining a set of adjoining triangular primitives of the object as one of a strip or a fan;

for the set of adjoining triangular primitives, performing the acts of:

classifying any edge along the perimeter of the set of adjoining triangular primitives that is not a starting edge or an ending edge as a class 1 border edge;

classifying any starting edge or an ending edge as a class 2 border edge; and assigning a unique index to each of the class 1 and class 2 border edges, with the same unique index being assigned to any duplicate border edges;

as the object is rendered, determining how many times each class 1 and class 2 border edge is rendered;

interpreting a class 1 or a class 2 border edge drawn exactly once, as opposed to any class 1 or class 2 border edge drawn more than once, as a silhouette edge; and applying an anti-aliasing operation to the silhouette edge.

10. A method as recited in claim 9, wherein the set of adjoining triangular primitives is defined as a fan, wherein the fan includes a plurality of triangular primitives, each of which shares a common vertex.

11. A method as recited in claim 9, wherein the set of adjoining triangular primitives is defined as a strip, wherein the strip includes a series of adjoining triangular primitives, with each triangular primitive in the series sharing any vertex with at most two other triangular primitives in the strip.

12. A method as recited in claim 9, wherein the object is a closed object, the method further comprising the act of identifying at least one of the primitives which is not to be rendered by performing back-face culling, including the act of determining that an in side of said at least one of the primitives faces toward a viewer of the object, the viewer being outside of the closed object.

13. A method as recited in claim 9, wherein the image includes a plurality of objects, at least one silhouette edge of one of the objects adjoining a primitive of another of the objects.

14. A method as recited in claim 9, wherein the set of adjoining triangular primitives includes any primitives that are subject to back-face culling.

15. In a system that renders an image including an object, and wherein the object is comprised of a plurality of primitives having edges, at least some of the edges being silhouette edges that define a visible perimeter of the object, a computer program product for implementing a method for more efficiently identifying the silhouette edges of the object in order to identify the visible perimeter portions of the rendered image which require anti-aliasing to reduce aliasing artifacts that would otherwise appear at the visible perimeter portions of the image, the computer program product comprising:

a computer readable medium carrying computer-executable instructions for implementing the method in the system, the method comprising the acts of:

generating a list of selected edges of primitives of the object;

determining how many times each of the selected edges in the list is drawing as the object is rendered during a first pass, determining which edges are drawn only once as opposed to edges drawn more than once, so that edges drawn only once can be identified as corresponding tosilhouette edges as opposed to those edges drawn more than once, which correspond to primitive edges that are not silhouette edges; and selecting those edges identified as silhouette edges; and applying an anti-aliasing operation to the silhouette edges.

16. A computer program product as recited in claim 15, wherein the object is a closed object and the primitives include triangular primitives, the method further comprising the acts of:

identifying a silhouette edge of the object by performing the acts of:

determining that a first triangular primitive is not rendered because the first triangular primitive is hidden from view by one or more other primitives; and determining that a second triangular primitive shares an edge with the first triangular primitive and that at least a portion of said shared edge is to be rendered as part of the second triangular primitive, so as to determine that said shared edge is a silhouette edge; and applying the anti-aliasing operation to said shared edge that is a silhouette edge.

17. A computer program product as recited in claim 16, wherein the method further comprises the act of grouping the triangular primitives into strips and fans, the strips and fans consisting of sets of one or more of the triangular primitives.

18. A computer program product as recited in claim 15, wherein the object is a closed object, the method further comprising the act of identifying at least one of the primitives which is not to be rendered by performing back-face culling, including the act of determining that an in side of said at least one of the primitives faces toward a viewer of the object, the viewer being outside of the closed object.

19. A computer program product as recited in claim 15, wherein the act of applying the anti-aliasing operation comprises the acts of:

selecting a line parallel to the silhouette edge, which line does not intersect the primitive that adjoins the silhouette edge;

selecting at least one anti-aliasing polygon having visual characteristics including opacity, such that:

the anti-aliasing polygons occupy a region between the line and the silhouette edge;

the anti-aliasing polygons vary in opacity such that the anti-aliasing polygons are transparent at the line and exhibit the same level of opacity at the silhouette edge as the primitive that adjoins the silhouette edge, and the visual characteristics, other than opacity, of the anti-aliasing polygons are consistent with the primitive that adjoins the silhouette edge; and rendering the anti-aliasing polygons to the image.

20. A computer program product as recited in claim 15, wherein the act of generating the list of selected edges comprises the act of including duplicate edges when a single selected-edge corresponds to more than one vertex.

21. A computer program product as recited in claim 20, wherein the method further comprises the act of assigning identifiers to the selected edges, wherein:

each identifier links one of the selected edges to a vertex; and each border edge is assigned a unique identifier, with duplicate edges receiving the same identifier, the identifiers being used to determine how many times each selected edge is rendered.

22. A computer program product as recited in claim 15, wherein the list of selected edges of primitives includes edges of any primitives that are subject to back-face culling.

23. In a system that renders an image including an object, and wherein the object is comprised of a plurality of primitives having edges, at least some of the edges being silhouette edges that define a visible perimeter of the object, a method for more efficiently identifying the silhouette edges of the object in order to identify the visible perimeter portions of the rendered image which require anti-aliasing to reduce aliasing artifacts that would otherwise appear at the visible perimeter portions of the image, the comprising the acts of:

determining how many times each of the selected edges is rendered during a first pass, determining which edges are rendered only once as opposed to edges rendered more than once, so that edges rendered only once can be identified as corresponding to silhouette edges of a trianglular primitive as opposed to those edges drawn more than once, which correspond to primitive edges of a triangular primitive that are not silhouette edges;

interpreting a selected edge drawn exactly once as a first silhouette edge, thereby identifying said first silhouette edge;

as the object is rendered, identifying a second silhouette edge of the object by performing the acts of:

determining that a first triangular primitive is not rendered because the first triangular primitive is hidden from view by one or more other triangular primitives; and determining that a second triangular primitive shares an edge with the first triangular primitive and that at least a portion of said shared edge is to be rendered as part of the second triangular primitive, so as to determine that said shared edge is said second silhouette edge; and applying an anti-aliasing operation to the first silhouette edge and to the second silhouette edge.

24. A method as recited in claim 23, wherein the object is a closed object, and wherein the act of determining that the first triangular primitive is not rendered comprises the act of determining that an in side of said first triangular primitive faces toward a viewer of the object, the viewer being outside of the object.

25. A method as recited in claim 23, wherein the act of identifying a first silhouette edge of the object is further conducted by performing the acts of:

generating a list of said selected edges; and assigning identifiers to the selected edges in the list, wherein:

each identifier links one of the selected edges to a vertex; and each border edge is assigned a unique identifier, with duplicate edges receiving the same identifier, the identifiers being used to determine how many times each selected edge is rendered.

26. A method as recited in claim 23, wherein the act of determining how many times each of the selected edges is rendered comprises the acts of:

defining a set of adjoining triangular primitives of the object as one of a strip or a fan;

for the set of adjoining triangular primitives, performing the acts of:

classifying any edge along the perimeter of the set of adjoining triangular primitives that is not a starting edge or an ending edge as a class 1 border edge;

classifying any starting edge or an ending edge as a class 2 border edge; and assigning a unique index to each of the class 1 and class 2 border edges, with the same unique index being assigned to any duplicate border edges, the class 1 and class 2 border edges being said selected edges; and as the object is rendered, determining how many times each class 1 and class 2 border edge is rendered.

27. A method as recited in claim 23, wherein the object is a three-dimensional object that is rendered on a two-dimensional display device, each vertex of the triangular primitives having three positional coordinates.

28. A method as recited in claim 23, wherein the selected edges of the triangular primitives of the object include edges of any primitives that are subject to back-face culling.

* * * * *

UNITED STATES PATENT AND TRADEMARK OFFICE
CERTIFICATE OF CORRECTION

PATENT NO. : 6,529,207 B1
DATED : March 4, 2003
INVENTOR(S) : Edouard Landau et al.

It is certified that error appears in the above-identified patent and that said Letters Patent is hereby corrected as shown below:

Column 4,
Line 11, after "each strip 104" insert -- are numbered in the order they are --

Column 5,
Line 47, after "701 is a closed" delete "is"
Line 53, after "which have their" delete "in sides" and insert -- insides --

Column 6,
Line 6, after "the image of" insert -- the --

Column 8,
Line 28, after "carried out by" delete "is"
Line 50, after "anti-aliasing of" delete "he" and insert -- the --

Column 10,
Line 61, after "The vertices" delete ".111" and insert -- 111 --

Column 15,
Line 7, after "portions of the image," delete "the"

Signed and Sealed this

Ninth Day of March, 2004

JON W. DUDAS
*Acting Director of the United States Patent and Trademark Office*